Figure 1:
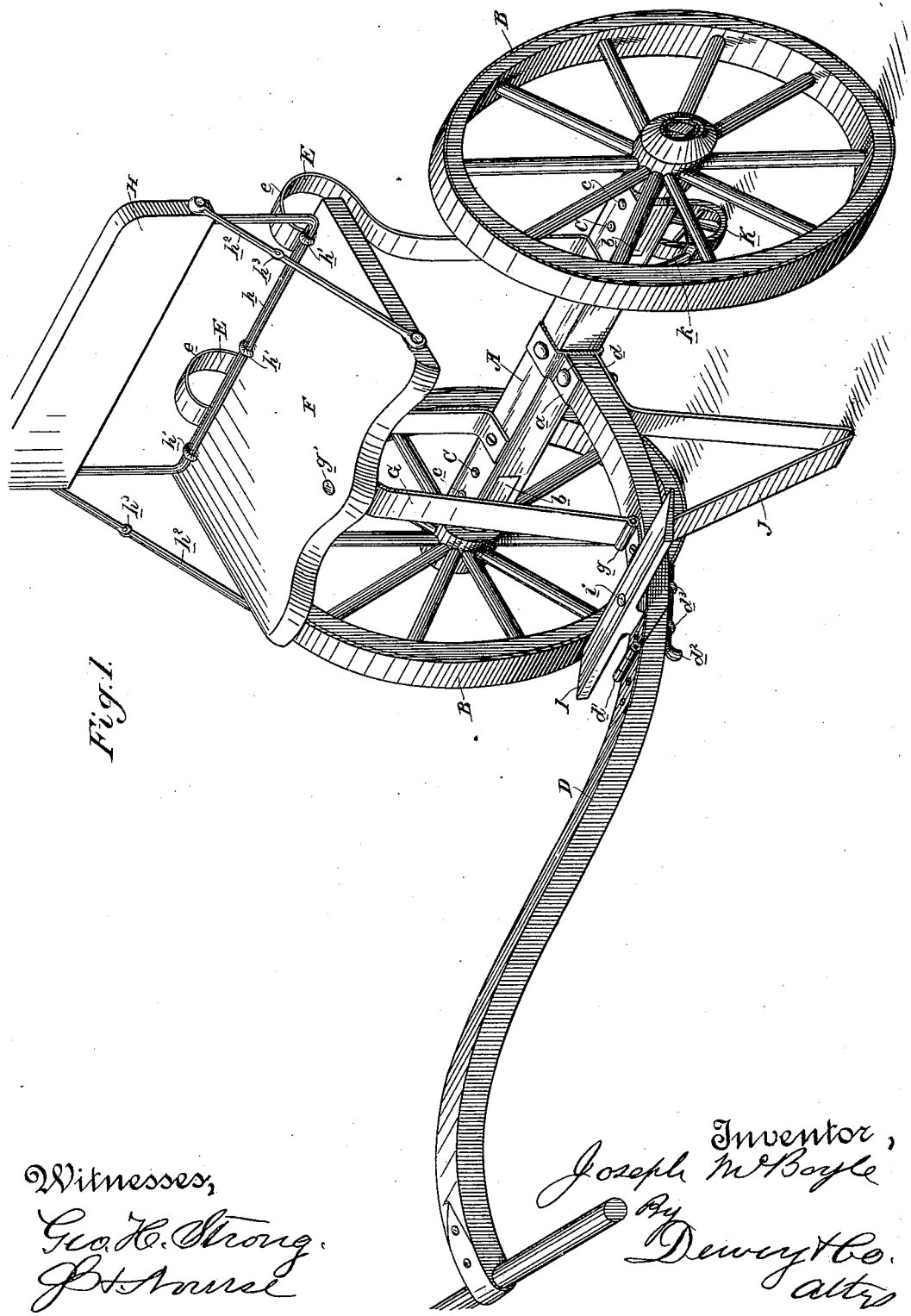

(No Model.)  J. McBOYLE.  2 Sheets—Sheet 1.
FOLDING VEHICLE.

No. 404,494.  Patented June 4, 1889.

Witnesses,
Geo. H. Strong.
J H Nurse

Inventor,
Joseph McBoyle
By
Dewey & Co.
Attys (No Model.) 2 Sheets—Sheet 2.
J. McBOYLE.
FOLDING VEHICLE.
No. 404,494. Patented June 4, 1889.
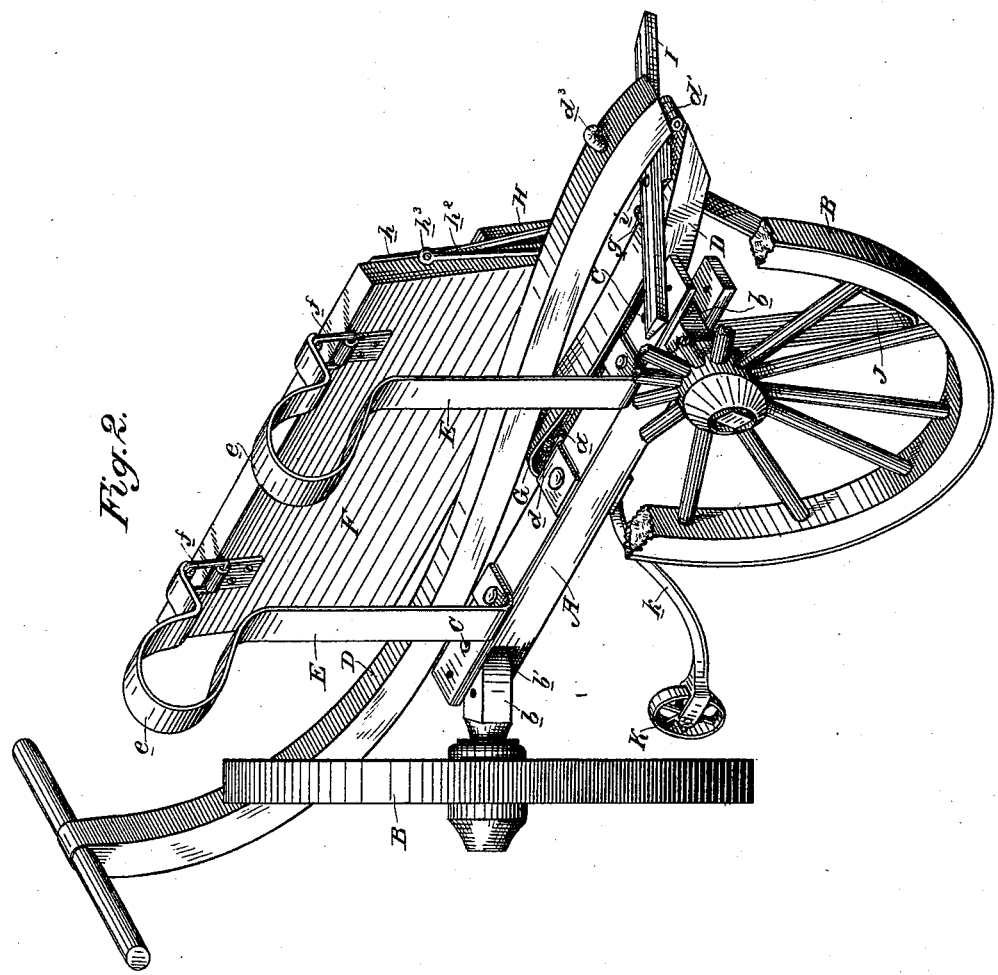
Witnesses,
Geo. H. Strong.
Inventor,
Joseph McBoyle
By Dewey & Co.
Attys

UNITED STATES PATENT OFFICE.

JOSEPH McBOYLE, OF OAKLAND, CALIFORNIA.

FOLDING VEHICLE.

SPECIFICATION forming part of Letters Patent No. 404,494, dated June 4, 1889.

Application filed March 19, 1889. Serial No. 303,940. (No model.)

*To all whom it may concern:*

Be it known that I, JOSEPH MCBOYLE, of the city of Oakland, county of Alameda, State of California, have invented an Improvement in Folding Vehicles; and I hereby declare the following to be a full, clear, and exact description of the same.

My invention relates to that class of vehicles in which the several parts are so arranged and connected as to adapt them to be folded, thereby reducing the vehicle to a smaller compass and rendering it portable.

The object of my invention is to provide a vehicle for a child's use which can be packed in small compass easily and carried about, and when required for use can be unfolded and be developed into a perfect and practical vehicle in which the child may be drawn.

My invention consists in the folding wheels, the folding tongue, the folding body or seat and folding back, the folding foot-rest, and in the combination and arrangement of these parts and their connections, all of which I shall hereinafter fully describe by reference to the accompanying drawings, in which—

Figure 1 is a perspective view of my vehicle ready for use. Fig. 2 is a view showing the parts folded, one of the wheels being broken away to avoid confusion and the other wheel being but partially folded.

A is the axle of my vehicle.

B are the wheels, mounted upon journals $b$. These journals are connected with the axle in such a manner as will permit the wheels to be folded on the axle. The connection here shown is formed by fitting the inner ends of said journals in the grooved or slotted ends of the axle and pivoting them therein by vertical pins C. This connection will permit the wheels to be turned from their plane of action at right angles to the axle to a plane parallel with said axle, either in front of it or back of it. I prefer, however, to turn the wheels back of the axle, and to do this I slightly round off the back corners of the journals $b$, as shown at $b'$, leaving the forward edges angular. This will permit the backward turning of the wheels and will limit their forward movement, so that in folding them no mistake is liable to be made. Pins $c$ are used to hold the journal-connection rigid when in use.

D is the tongue of the vehicle. This is hinged or pivoted to the axle in such a manner that it may be turned from its normal position to a position parallel with the axle. The connection is here shown as being made by fitting the rear end of the tongue in a clip $a$ on the axle and pivoting it by a pin or bolt $d$. This turning of the tongue to a plane parallel with the axle is not interfered with by the wheels, which, as before stated, turn to the back of the axle.

In order to decrease the length of the tongue when in a folded position, I sever it and connect the sections by a hinge $d'$, the joint being held rigid when the tongue is in use by means of a sliding bolt $d^2$, seated in staples $d^3$ under the sections.

E is the body or seat supporting springs, and F is the body or seat. The springs are secured to the axle and have the shape shown, with rearwardly-extending upper portions $e$, to avoid interference with the wheels when folded back. I do not, however, confine myself to this shape of springs, as other shapes may be used, and, in fact, any suitable support occupying a reasonably small space may be employed.

The body or seat F is hinged to the springs or supports E, so that it may be turned from a horizontal position when in use to a vertical position when folded. The hinge-connection is here shown as consisting of links $f$, pivoted to both the springs and seat, this connection permitting the back portion of the seat to find considerable bearing-surface on the spring tops when said seat is in use, and yet allowing it to clear said tops when folded down.

The seat F is held in a horizontal position by a standard G, preferably of a springy nature, the lower end of the standard being hinged at $g$ to the tongue, and its upper end bearing under the forward portion of the seat and suitably secured thereto, as by a pin $g'$.

H is a lazy-back hinged to the seat and adapted to be folded down thereon. The connection is here shown as a wire bail $h$, pivoted by staples $h'$ to the back of the seat, and side braces $h^2$, jointed at $h^3$. Suitable folding side pieces may be attached to the ends of the seat, if desired.

I is a foot-rest pivoted by a bolt $i$ on the tongue. This foot-rest is adapted to be turned, when in use, to a position at right angles with the tongue, and when out of use to a position parallel therewith, in this latter position lying directly on top of the tongue. Under the tongue is the usual supporting-standard J, which is adapted to hold the vehicle upright when at a standstill. Secured by a bent arm $k$ to the back of the axle is a safety-roller K, which is for the purpose of preventing the vehicle from tipping too far backwardly.

The operation of the vehicle is as follows: Suppose it to be in position for use and that it be desired to fold it, so as to render it portable. The pins $c$ are removed from the axle ends, so as to free the journal-connection. The wheels are then turned backwardly, so as to lie behind and parallel with the axle. The supporting-standard G is now released from the seat and temporarily thrown back. The lazy-back H is then folded down on the seat, and the seat itself is folded down to a vertical position. The tongue is now turned to a plane parallel with the axle, and the standard G is folded down inwardly on the tongue. The joint-holding bolt $d^2$ is then removed, and the jointed tongue is folded back upon itself. This completes the folding of the vehicle, which is thus reduced to a small compass and may be easily carried about from place to place until wanted for use, when the parts may be unfolded and adjusted in position. If desired the seat may fold outside the tongue.

Although I have described and illustrated a two-wheeled vehicle, it is obvious that vehicles of other kinds may be similarly arranged.

Having thus described my invention, what I claim as new, and desire to secure by Letters Patent, is—

1. In a folding vehicle, and in combination with its axle, wheels hinged to said axle, whereby they may be turned from their position when in use to a folded position when out of use, substantially as described.

2. In a folding vehicle, and in combination with its axle and wheels, journals on which the wheels are mounted, and a pivot or hinge connection between said journals and the axle, whereby the wheels may be turned to a folded position, substantially as described.

3. In a folding vehicle, and in combination with its axle and wheels, journals on which the wheels are mounted, and vertical pivot-pins connecting the journals with the axle, whereby the wheels may be turned from a plane at right angles to said axle to a plane parallel therewith, substantially as described.

4. In a folding vehicle, and in combination with its axle and wheels, journals on which the wheels are mounted, fitted in slotted or grooved ends of the axle and adapted to be turned backwardly therein, and vertical pins pivoting the journals to the axle ends, whereby the wheels may be turned to the back of the axle in a plane parallel therewith, substantially as described.

5. In a folding vehicle, and in combination with its axle and wheels, the journals on which the wheels are mounted, fitting the axle ends, the vertical pivot-pins connecting the journals with the axles, whereby the wheels may be turned to a plane parallel with the axle, and the removable pins for holding the journals in line with the axle when the wheels are in use, substantially as described.

6. In a folding vehicle, and in combination with the axle, the tongue hinged or pivoted to said axle, adapted to be turned from a plane at right angles to the axle to a plane parallel therewith, substantially as described.

7. In a folding vehicle, and in combination with the axle, the tongue and the connection between the tongue and axle, consisting of the axle-clip into which the tongue fits, and the vertical pivot pin or bolt securing the tongue therein and permitting it to be turned to a plane parallel with the axle, substantially as described.

8. In a folding vehicle, and in combination with the axle, the tongue hinged or pivoted thereto, whereby it may be turned to a plane parallel with the axle, said tongue having a hinged joint in its own length, whereby one section may be folded over on the other section, substantially as described.

9. In a folding vehicle, and in combination with its wheeled axle and suitable seat-supports carried thereby, the seat hinged to said supports, whereby it may be turned from a horizontal to a vertical position, substantially as described.

10. In a folding vehicle, its wheeled axle, suitable seat-supports carried thereby, and its tongue, the seat hinged to said supports, whereby it may be turned from a horizontal to a vertical position, and the standard G, hinged to the tongue and adapted to support the seat in a horizontal position and to relieve it when about to be turned to a vertical position, substantially as described.

11. In a folding vehicle, its wheeled axle and the seat-supporting springs rising therefrom, in combination with the seat and the links hinged to both seat and springs, substantially as described.

12. In a folding vehicle, the combination of the hinged seat adapted to be turned from a horizontal to a vertical position, and the lazy-back hinged to the seat and supported by jointed braces, whereby said lazy-back may be folded down on the seat, substantially as described.

13. In a folding vehicle, and in combination with its tongue, the foot-rest pivoted upon said tongue and adapted to be turned from a position at right angles to said tongue to a position parallel therewith, substantially as described.

14. In a folding vehicle, the combination of the axle, the wheels having journals pivoted or hinged to said axle, whereby said wheels may be turned to the back of the axle in a plane parallel therewith, the seat-supporting springs rising from the axle and having backwardly-extending top portions avoiding the wheels when turned, and the seat supported by the springs, substantially as described.

15. In a folding vehicle, the combination of the axle, the wheels pivoted or hinged thereto, whereby they may be turned to the back of the axle in a plane parallel therewith, the seat-supporting springs rising from the axle, the folding seat hinged to said springs, the tongue hinged to the axle, whereby it may be turned to a plane parallel with the axle, and the seat-supporting standard hinged to the tongue, substantially as described.

16. A folding vehicle consisting of the axle, the wheels hinged thereto and adapted to be turned to the back of the axle, the springs rising from the axle, the seat hinged to the springs and adapted to be turned from a horizontal to a vertical position, the jointed tongue hinged to the axle and adapted to be turned to a plane parallel therewith, the seat-supporting-standard hinged to the tongue, and the foot-rest pivoted on the tongue and adapted to be turned from a position at right angles to a position parallel with said tongue, substantially as described.

In witness whereof I have hereunto set my hand.

JOSEPH McBOYLE.

Witnesses:
S. H. NOURSE,
H. C. LEE.